(12) United States Patent
Shaughnessy et al.

(10) Patent No.: US 8,315,907 B2
(45) Date of Patent: Nov. 20, 2012

(54) SPONSOR-BASED DESKTOP CUSTOMIZATION AS A REVENUE STREAM

(75) Inventors: Monica J. Shaughnessy, Houston, TX (US); Mark J. Altendorf, Spring, TX (US); Arthur M. Saxby, Sugarland, TX (US); Gaurav Sood, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3861 days.

(21) Appl. No.: 10/127,119

(22) Filed: Apr. 22, 2002

(65) Prior Publication Data

US 2003/0200542 A1 Oct. 23, 2003

(51) Int. Cl.
*G06Q 30/00* (2012.01)
*G06F 3/00* (2006.01)
*G06F 9/445* (2006.01)

(52) U.S. Cl. .................. 705/14.69; 705/14.56; 715/744; 715/745; 715/747; 717/174

(58) Field of Classification Search .................... 705/14, 705/26; 345/333, 738; 709/218
See application file for complete search history.

(56) References Cited

U.S. PATENT DOCUMENTS

| | | | | |
|---|---|---|---|---|
| 6,167,383 A * | 12/2000 | Henson | | 705/26 |
| 6,262,726 B1 * | 7/2001 | Stedman et al. | | 715/745 |
| 6,512,526 B1 * | 1/2003 | McGlothlin et al. | | 715/762 |
| 6,578,199 B1 * | 6/2003 | Tsou et al. | | 717/178 |
| 6,961,712 B1 * | 11/2005 | Perkowski | | 705/27 |
| 2001/0029527 A1 * | 10/2001 | Goshen | | 709/218 |
| 2002/0184095 A1 * | 12/2002 | Scullard et al. | | 705/14 |
| 2003/0122864 A1 * | 7/2003 | Jenne et al. | | 345/738 |
| 2004/0204988 A1 * | 10/2004 | Willers et al. | | 705/14 |

* cited by examiner

*Primary Examiner* — Eric W Stamber
*Assistant Examiner* — Affaf Ahmed

(57) ABSTRACT

The specification describes a method for realizing revenue streams for computer manufacturers apart from hardware sales. More particularly, the specification discloses a method where personal computers are configured such that each user has an individual login capability, and each user may experience a different desktop theme and related overall customization. The end-user may select a particular theme, and each theme is based on the goods and/or services of a sponsor of that theme. The computer manufacturer realizes revenue initially for enabling the end-user to select particular themes, but also realizes a revenue for end-users selecting themes. Further, the specification discloses a method where computer manufacturers realize revenue by generation of internet traffic to, and electronic-commerce on, a sponsor's internet sites.

8 Claims, 3 Drawing Sheets

FIG. 4

SPONSOR-BASED DESKTOP CUSTOMIZATION AS A REVENUE STREAM

CROSS-REFERENCE TO RELATED APPLICATIONS

None.

STATEMENT REGARDING FEDERALLY SPONSORED RESEARCH OR DEVELOPMENT

Not applicable.

BACKGROUND OF THE INVENTION

1. Field of the Invention

The preferred embodiments of the present invention are directed generally to producing a revenue stream for computer manufacturers apart from revenue associated with the sale of hardware. More particularly, the preferred embodiments are directed to user-selectable desktop customizations that indirectly promote the products and services of participating corporations.

2. Background of the Invention

Computer manufacturers of the related art seek revenues, and therefore profits, not only from the sale of computer hardware, but also under an internet-based web traffic advertising system. In particular, computer manufacturers of the related art provide many "features" with their computers which increase traffic to internet web sites. For example, many computer manufacturers of the related art have keyboard "hot keys" that are not part of the standard or extended QWERTY keyboard, but instead are programmed to perform very specific functions, like directing the computer user's browser to a particular website. In the related art business systems, this feature is noted by the target website and the computer manufacturer receives a bounty for assisting the user in finding the website.

In related revenue models, the owner and operator of one website may have many "banner advertisements" at various locations throughout the site. If the user of the first web site transitioned to a website identified in one of the banner advertisements by activating the banner advertisement, the main web site owner may be paid a bounty for inducing the secondary web traffic.

However, as the state of the art of capitalism progresses in the internet age, companies are no longer willing to pay bounties for mere internet traffic. Stated otherwise, the advertising model of internet usage is starting to wain, lessening computer manufacturers' revenue based on the advertising type add-ons and features for consumer-based computer systems.

Thus, what is needed in the art is a new method of monetizing electronic-commerce opportunities by personal computer manufacturers.

BRIEF SUMMARY OF SOME OF THE PREFERRED EMBODIMENTS

The problems noted above are solved in large part by a method that monetizes an electronic-commerce partner of the computer manufacturer through the presentation of personal computer customizations that provide brand exposure to the partner, as well as direct links to that partner's internet sites for electronic-commerce purposes. More particularly, in the preferred embodiments, personal computer manufacturers supply computer systems where each user of a particular computer, for example each member in a household, is capable of selecting a customization having a theme that is related to the sponsor or partner's goods and/or services. Thus, in a family of four it may be possible to have four different customizations, each customization providing different thematic elements and a brand exposure to the personal computer manufacturers' partners. Further, each customization may be automatically updated over time to reflect changes in the goods and/or services of a sponsor of each theme. Revenue streams for the personal computer manufacturer in the preferred embodiments are based, in part, on an up-front cost to the partner for configuring the personal computer to support the possible selection as a customization option. An additional revenue stream of the computer manufacturer of the preferred embodiment is realized each time an end-user selects a customization that is based on the sponsor or partners goods and/or services. The computer manufacturer may also realize revenue associated with the end-user making electronic-commerce purchases from links associated with the customization. Additionally, the computer manufacturer realizes revenues based on use of programmable "hot buttons" on the key-board, each button programmable based on the particular desk-top theme, which are utilized by the end-user to view or possibly purchase products or services of the sponsor.

The disclosed devices and methods comprise a combination of features and advantages which enable it to overcome the deficiencies of the prior art devices. The various characteristics described above, as well as other features, will be readily apparent to those skilled in the art upon reading the following detailed description, and by referring to the accompanying drawings.

BRIEF DESCRIPTION OF THE DRAWINGS

For a detailed description of the preferred embodiments of the invention, reference will now be made to the accompanying drawings in which:

FIG. 4 shows an exemplary browser software screen customization; and

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

DETAILED DESCRIPTION OF THE PREFERRED EMBODIMENTS

The preferred embodiments of the present invention are directed to providing desktop themes and other customizations adapted for each user of a personal computer system which are based on products and services offered by entities associated with the manufacturer of the personal computer system. These personal computers may comprise desktop computers, laptop or portable computers, servers, and the like. Thus, the preferred embodiments will be described in this context; however, one of ordinary skill in the art, after reading and understanding the discussion below, could easily expand this technology to other computer systems that link consumers to the internet, such as, but not limited to, hand-held electronic-mail receiving and sending devices, cell phones, personal digital assistants, and the like. Thus, the term computer system should be read in its broadest sense to comprise personal computer systems as well as other digital computing and communication devices.

Figure 1:
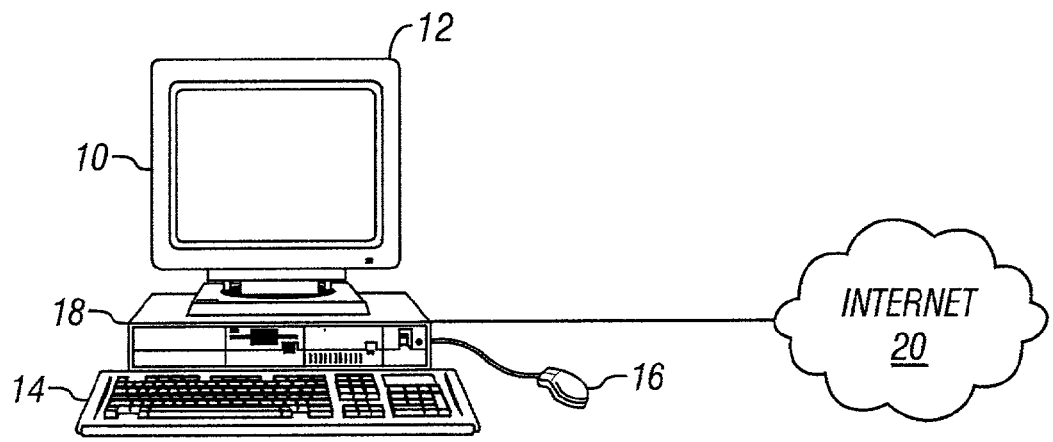
FIG. 1 shows a computer system of the preferred embodiment.

The preferred embodiments of the present invention are embodied in personal computers running under the Windows® XP operating system produced by Microsoft, Inc. of Redmond, Wash. While Windows® XP is preferred, any suitable operating system may be used such as, but not limited to, prior and future versions of Windows®, WinCE, Linux, Macintosh, and the like. The personal computer system of the preferred embodiment couples to and preferably is in communication with other computers acting as servers on the internet. FIG. 1 exemplifies that a computer system 10 of the preferred embodiment comprises a monitor 12, keyboard 14, mouse 16, and CPU enclosure 18 coupled to the internet 20. The computer system 10 of the preferred embodiments is a Compaq® computer; however, one of ordinary skill in the art, after reading and understanding the discussion below, could easily implement the systems and related methods on any computer system. FIG. 1 shows the computer 10 coupled to the internet 20, and this coupling may be through any suitable means, such as a dial-up connector, Ethernet connection, digital subscriber line (DSL) connection, cable modem, or the like.

In the Windows® XP operating system, each user has the capability of having an independent logon and computer use experience. In an exemplary family of four comprising a mother, a father, an older child, and a younger child, each of the four family members may have an individual logon. The preferred embodiments of the present invention leverage the Windows® XP technology and allows the user to select from customized themes provided by the computer manufacturer that are based, in whole or in part, on the products and services of the computer manufacturers' partners or sponsors.

Figure 2:
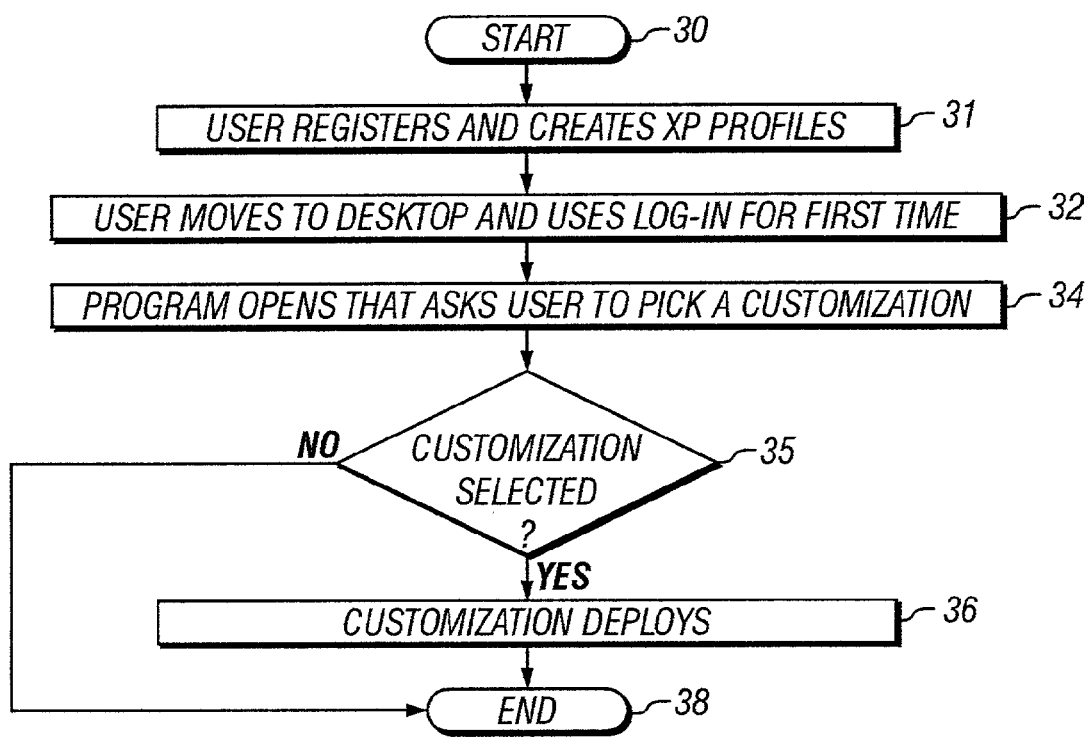
FIG. 2 shows a sequence for creation of a customization of the preferred embodiments.

FIG. 2 exemplifies the preferred sequence for a user to create a customization of the preferred embodiment. In particular, the process starts (step 30) and in the first step a user of a new computer registers the Windows® XP operating system and creates the necessary profiles (step 31). Thereafter, the user drops to a log-in screen for the desktop and logs in, for the first time (step 32). In a computer system that does not provide customizations of the preferred embodiments, the user simply moves to the standard Windows® XP desktop at that point. However, in the preferred embodiments, dropping to the desktop for the first time preferably invokes a program that gives the user the ability to choose a customization from a customization set to be associated with their particular profile (step 34). As will be discussed more fully below, these customization sets may take on many variations, such as sports, kids, home/garden, financial and the like, which are, on an underlying basis, linked to the products and services of the computer manufacturers' partners. If a customization is selected (step 35), the customization deploys (step 36). If, however, at step 35 the user elects not to choose a customization step, the process immediately ends (step 38). Preferably, the steps shown in FIG. 2 occur each time a user logs in with their particular profile for the first time. Each time the user logs in thereafter, the customization appears automatically. The customizations offered may be generic and may comprise one or more of the following: music, movies, television, gaming, kids, sports, women's interests, education and research, travel, geography, news, and finance. Further, any individual high-level customization category may have sub-categories thereunder. For example, in the music category, users may be able to select from different types of music, for example, RAP, country, rock, classical, jazz and the like. Likewise, a user selecting a movie category as an overall customization may be able to further select subcategories such as action movies, love stories, comedies, foreign language films, particular movies of interest, and the like. The categories and/or subcategories may also be may also be brand specific, for example the sports category may be the ESPN Sports Zone, or the kids category may be identified as the Disney Kids Channel. One of ordinary skill in the art, now understanding the concepts of providing the customizations could easily create many equivalent customizations, and sub-customizations, and all such customizations would be within the contemplation of this invention.

Figure 3:
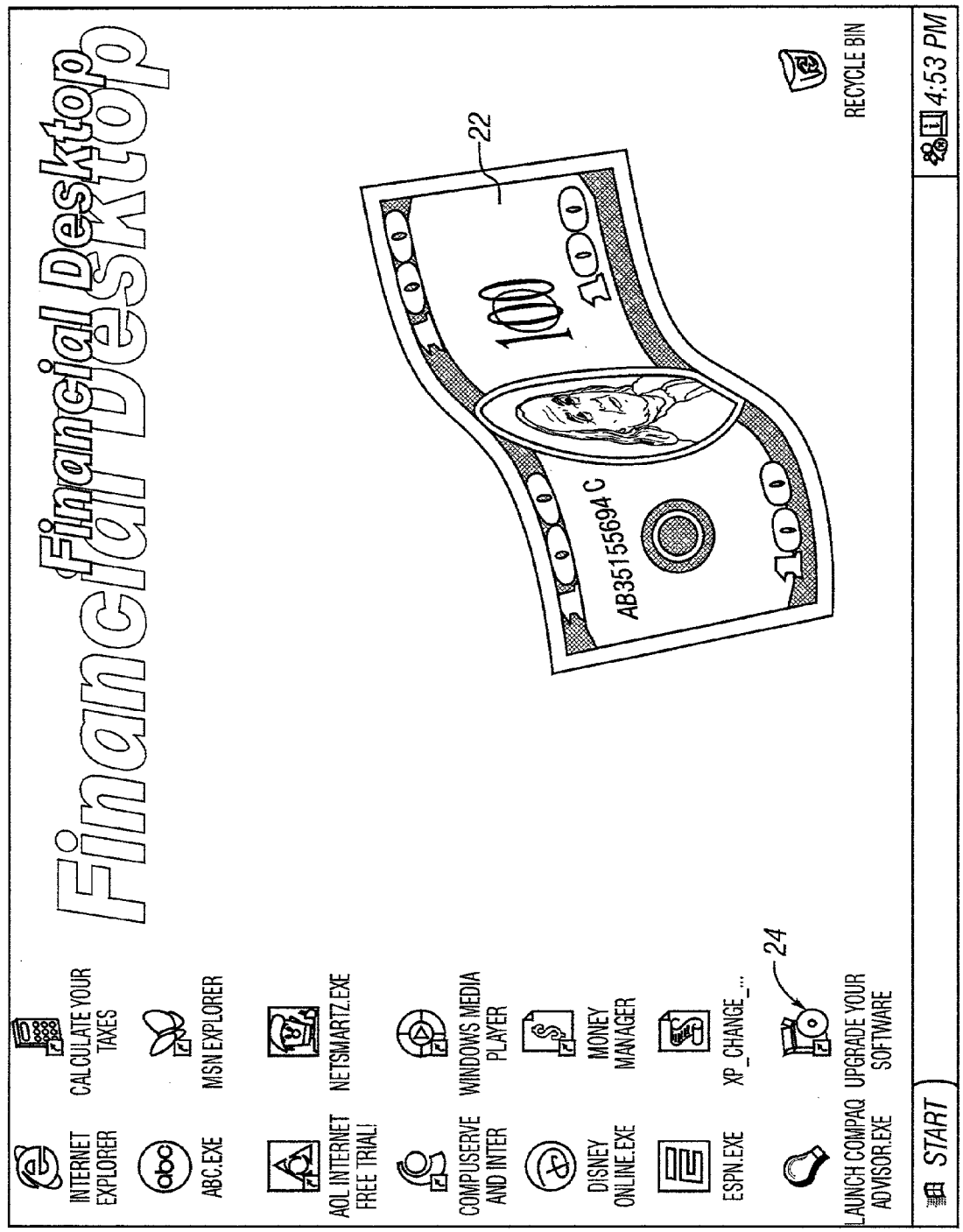
FIG. 3 shows an exemplary screen shot of a financial customization system.
Figure 4:
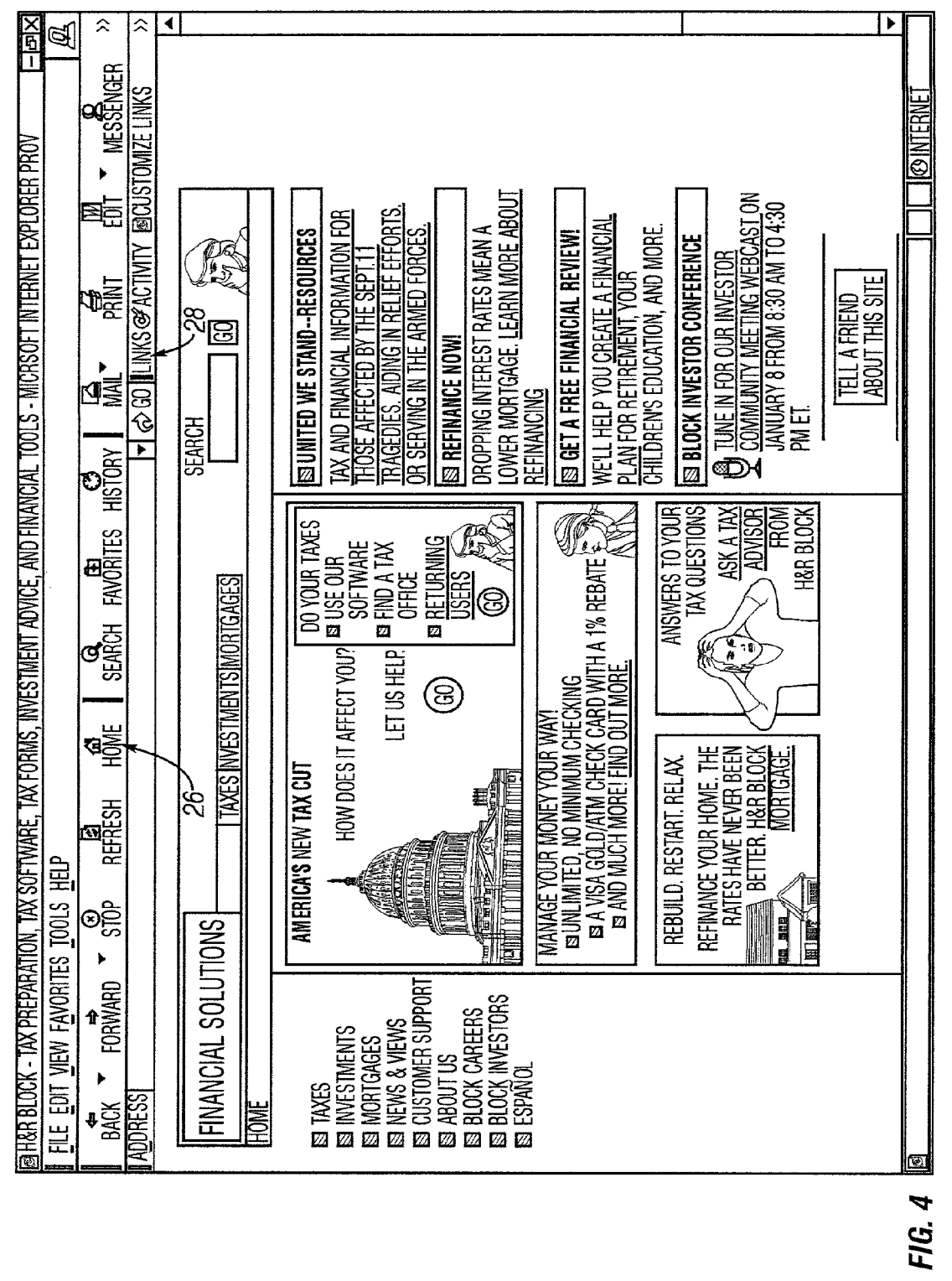

For purposes of further discussion it is assumed that the user selects a financial customization. In the preferred embodiments, the financial customization selection may do many things. The desktop itself, for example, the desktop wallpaper, icon and cursor and colors, may change from the standard desktop. FIG. 3 shows an exemplary screen shot of a financial customization system. Note the financially oriented theme of the desktop of FIG. 3 comprising money wallpaper 22. Additionally, the customization may set a custom screen saver following the thematic elements of the customization. Importantly for the monetization of the customization for the computer manufacturer, selection of the particular customization may also add desktop icons that are not part of the Windows® XP standard package, such as links to accounting software or software upgrades 24. The desktop icons may include links to the computer manufacturer's partners, which in the case of a financial customization could be banks, mutual funds, stock brokers, accountants, and the like. Further customizations comprise setting the default or home website and button 26 on internet browsers to point to the computer manufacturer's partners internet sites, as well as adding links to tool bars 28 in the user's internet browser, as shown in FIG. 4.

Figure 5:
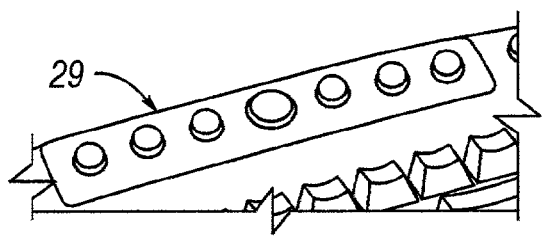
FIG. 5 shows an exemplary set of hot-keys of the preferred embodiments.

Another customization comprises use of keyboard shortcut, "hot-keys" or "hot-buttons" to launch the internet browsers to show internet destinations of the computer manufacturers' partners. FIG. 5 shows an exemplary set of hot-keys 29. What should be understood about this customization is that these buttons are reprogrammed depending on a particular user's selected customization and corresponding theme. Thus, the internet hot-buttons for a financial customization preferably point to the possible partners listed above, while the hot-button internet shortcuts for young children may be directed to websites for those individuals. One of ordinary skill in the art, now understanding the various desktop elements and possible additional programs that could change in the customization could easily devise many equivalent such customizations, and such equivalents would be within the contemplation of this invention.

The revenue stream of the preferred embodiment has many facets. Preferably, the computer manufacturer charges the sponsor or partner an up-front cost for installing the customization set on each personal computer manufactured. That is, regardless of whether a user actually chooses a customization that is based on the sponsor's goods and/or services, the computer manufacturer obtains a revenue stream. A second facet of the revenue stream for the computer manufacturer is when a particular customization is selected. That is, while many customizations may be available, the computer manufacturer receives a fee or bounty when a user selects the customization of a particular sponsor. The computer manufacturer preferably realizes an additional revenue stream when the customization is updated. In the preferred embodiments, updates to the customizations are provided to the user's computer automatically and over time, without (or with only minimal) interference with the user's internet use experience. After all the required information exists on the user's computer, the user is notified by way of a messaging interface that a new customization has been downloaded to their system for selection For example, if the customization has as an underlying sponsor a movie studio, then periodically with the release of a new movie, additional customization updates may be available, such as new movie-specific screen savers and wallpaper for the desktop. If an end-user elects to install the updated customization, the computer manufacturer receives a revenue stream based on those subsequent updates.

Additional revenue streams for the computer manufacturer comprises bounties associated with generation of web traffic from the customization, for example by the user's selection of desktop icons, whose initial pages have been set to the sponsor's site, favorites links, hot buttons on keyboards and the like. The computer manufacturers' revenue stream may also be based on a percentage of net sales at electronic-commerce sites where the initial contact was based on customizations.

Many of the features of the customizations are controlled in standard application program interface (API) calls by software. Thus, in the preferred embodiments the program to prompt the user for a particular customization and apply those customizations across the standard interfaces such as wallpaper, desktop themes, and the like, may be written in any suitable programming language such as SAP, C, C++, Visual C, Visual Basic, and the like. Moreover, prompting a user of a customization as to whether they are interested in receiving an update, when available, may be done by contacting the computer manufacturer over an internet connection detected using standard internet connection software.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method comprising:
    installing an operating system on a computer system;
    installing a custom program by a computer manufacturer, the custom program provides sponsor-based customizations regarding operation of the operating system, the customizations advertising particular sponsors; and then
    allowing a user to choose at least one sponsor-based customization;
    applying the at least one sponsor-based customization; and
    obtaining revenue by the computer manufacturer from a sponsor for each user who chooses at least one sponsor-based customization.

2. The method as defined in claim 1 further comprising charging, by the computer manufacturer, the sponsor for each computer system in which the custom program is installed.

3. The method as defined in claim 1 further comprising:
    wherein installing a custom program further comprises installing a custom program that monitors the computer system for an initial user logon; and
    wherein allowing a user to choose at least one sponsor-based customization further comprises allowing the user to choose at least one sponsor-based customization contemporaneously the initial user logon.

4. The method as defined in claim 1 further comprising applying the sponsor-based customization by selecting at least one selected from the group consisting of: a wallpaper setting; a cursor setting; and a screen saver.

5. The method as defined in claim 1 further comprising:
    providing updates to at least one sponsor-based customization; and
    allowing the user to selectively install the updates.

6. The method as defined in claim 5 wherein providing updates further comprises downloading the updates to the user's computer prior to the allowing.

7. The method as defined in claim 6 wherein allowing further comprises allowing the user to selectively install previously downloaded updates.

8. The method as defined in claim 5 further comprising charging the sponsor for each update selected by the user.

* * * * *